US009989140B2

United States Patent
Onitake et al.

(10) Patent No.: US 9,989,140 B2
(45) Date of Patent: Jun. 5, 2018

(54) POWER TRANSMISSION INTERRUPTING DEVICE AND LIMITED-SLIP DIFFERENTIAL

(71) Applicant: JTEKT CORPORATION, Osaka-shi (KR)

(72) Inventors: Minoru Onitake, Kariya (JP); Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days. days.

(21) Appl. No.: 15/444,545

(22) Filed: Feb. 28, 2017

(65) Prior Publication Data

US 2017/0254399 A1 Sep. 7, 2017

(30) Foreign Application Priority Data

Mar. 2, 2016 (JP) .................................. 2016-039990
Jun. 2, 2016 (JP) .................................. 2016-111138
Jun. 2, 2016 (JP) .................................. 2016-111139

(51) Int. Cl.
| F16H 48/24 | (2006.01) |
| F16H 48/10 | (2012.01) |
| F16H 48/34 | (2012.01) |
| F16D 11/14 | (2006.01) |
| F16D 27/09 | (2006.01) |

(52) U.S. Cl.
CPC ............. *F16H 48/24* (2013.01); *F16D 11/14* (2013.01); *F16D 27/09* (2013.01); *F16H 48/10* (2013.01); *F16H 48/34* (2013.01)

(58) Field of Classification Search
CPC .......... F16H 48/24; F16H 48/10; F16H 48/34; F16D 27/09; F16D 11/14
See application file for complete search history.

(56) References Cited

U.S. PATENT DOCUMENTS 5,156,578 A * 10/1992 Hirota ................ B60K 17/3462
   475/150
5,366,421 A * 11/1994 Hirota .................... B60K 17/20
   475/231

(Continued)

FOREIGN PATENT DOCUMENTS

JP       2010-84930 A       4/2010

*Primary Examiner* — David J Hlavka
(74) *Attorney, Agent, or Firm* — Oblon, McClelland, Maier & Neustadt, L.L.P.

(57) ABSTRACT

A power transmission interrupting device includes: an interrupting member restrained from rotating relative to a first rotating member and movable in an axial direction between a coupling position at which the interrupting member engages with the second rotating member and an uncoupling position; and a moving mechanism moving the interrupting member in the axial direction. The moving mechanism has a magnetic flux generation unit, a holder unit, and a moving member. The holder unit includes: a yoke having a cylindrical part that faces the magnetic flux generation unit in a radial direction; and a restraint member having an axial movement restraining part that is fixed to the yoke and restrains the magnetic flux generation unit from moving in the axial direction relative to the cylindrical part, and a rotation restraining part that is locked in a locking portion provided in the case member and restrains the yoke from rotating.

7 Claims, 11 Drawing Sheets

(56) References Cited

U.S. PATENT DOCUMENTS

| | | | | |
|---|---|---|---|---|
| 2008/0015076 A1* | 1/2008 | Fusegi | ............... | F16H 48/08 475/252 |
| 2008/0042791 A1* | 2/2008 | York | ............... | F16H 48/08 335/296 |
| 2008/0146353 A1* | 6/2008 | Boffelli | ............... | F16H 48/08 464/29 |
| 2010/0056314 A1* | 3/2010 | Maruyama | ............... | F16H 48/08 475/150 |
| 2010/0179736 A1* | 7/2010 | Johnson | ............... | F16H 48/30 701/51 |
| 2011/0105264 A1* | 5/2011 | Maruyama | ............... | F16D 27/118 475/150 |
| 2013/0237363 A1* | 9/2013 | Fusegi | ............... | F16H 48/24 475/230 |

* cited by examiner

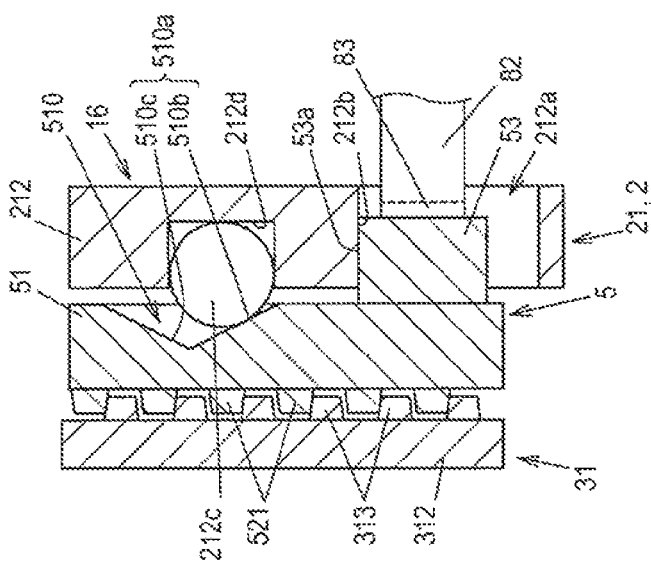
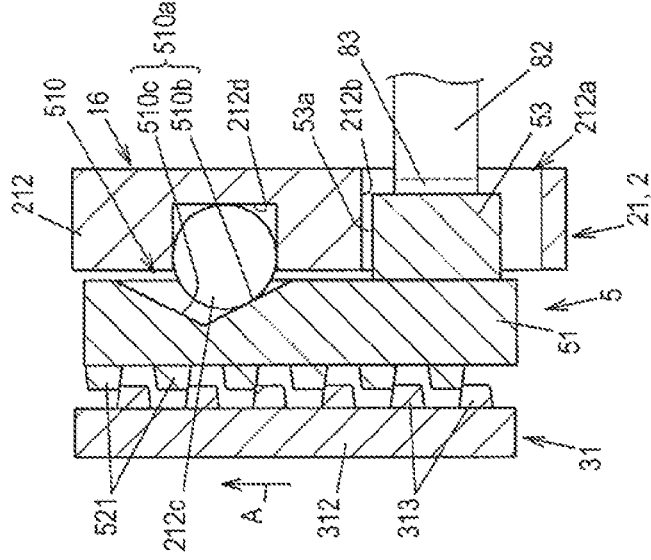
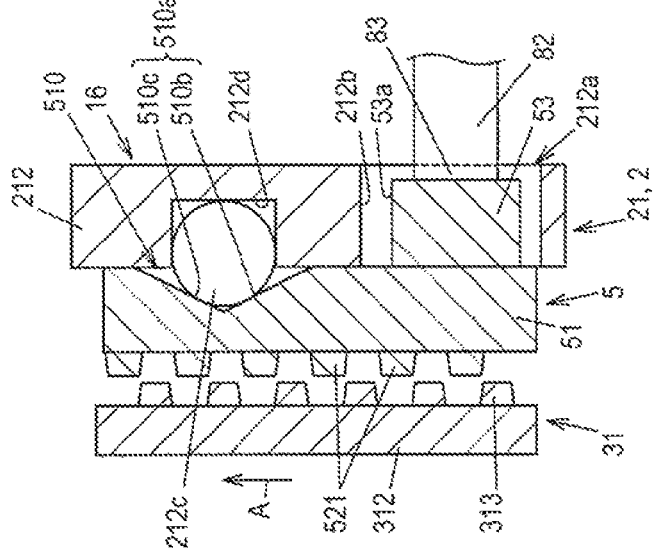

POWER TRANSMISSION INTERRUPTING DEVICE AND LIMITED-SLIP DIFFERENTIAL

INCORPORATION BY REFERENCE

The disclosure of Japanese Patent Application No. 2016-039990 filed on March 2 and Japanese Patent Application No. 2016-111138 and 2016-111139 filed on Jun. 2, 2016, each including the specification, drawings and abstract is incorporated herein by reference in its entirety.

BACKGROUND

1. Technical Field

The present disclosure relates to a power transmission interrupting device and a limited-slip differential.

2. Description of Related Art

Among differential gears that allocate power to the left and right wheels of a vehicle allowing for differential motion thereof, some are equipped with a positive clutch for limiting the differential motion of rotating members that are rotatable relative to each other (e.g., see Japanese Patent Application Publication No. 2010-84930).

The differential gear described in JP 2010-84930 A has a differential case, a pair of pinion gears rotatably supported on a pinion shaft that is fixed to the differential case, a pair of side gears meshing with the pair of pinion gears with the gear axes orthogonally crossed, an interrupting member disposed so as to be movable in the axial direction while engaged in a hole formed in the differential case in a rotation direction, and an actuator that moves the interrupting member in the axial direction.

The interrupting member has engaging teeth engaging with one side gear of the pair of side gears, and rotates with the differential case. The actuator has an electromagnet and a movable member that moves in the axial direction under a magnetic force of the electromagnet. The electromagnet is composed of a magnet coil and a core disposed so as to surround the magnet coil. The movable member is composed of a plunger made of a soft magnetic material, and a ring that is made of a non-magnetic material and prevents magnetic flux of the electromagnet from leaking to the differential case. The movable member is disposed inside the electromagnet, and the electromagnet and the interrupting member are disposed side by side in the axial direction.

When current is applied to the electromagnet, the plunger moves toward the interrupting member, causing the ring to press the interrupting member through a plate fixed to the interrupting member. Under this pressing force, the interrupting member moves in the axial direction and engages with the one side gear. Thus, relative rotation of the differential case and the one side gear is restrained, and differential rotation of the pair of side gears is also restrained accordingly.

SUMMARY

In the differential gear of JP 2010-84930 A, the core denoted by reference sign 79 in FIG. 1 of the disclosure is formed in a substantially quadrangular shape in cross-section so as to surround the magnet coil, and the part of the core facing a part of the inner circumferential surface of the magnet coil is discontinuous. The plunger is disposed with one axial end facing this discontinuous part, and constitutes part of the magnetic flux generated as current is applied to the magnetic coil.

A core with such a shape is difficult to form by a single member. It is therefore necessary, for example, as shown in FIG. 1 of JP 2010-84930 A, to combine three members by welding etc.: one member covering one axial side surface and a part of the inner circumferential surface of the magnet coil, another member covering the other axial side surface of the magnet coil, and the other member covering the outer circumferential surface of the magnet coil. However, this makes the structure and the manufacturing process of the core complicated, causing an increase in manufacturing cost.

Moreover, in a differential gear having an electromagnet as an actuator, supplying electricity to the magnet coil of the electromagnet requires to prevent rotation of the magnet coil and the core. While a member that prevents rotation of the core is not shown in the drawings of JP 2010-84930 A, additionally fixing such a rotation preventing member to the core of the above configuration would make the core structure more complicated.

Therefore, the present disclosure provides a power transmission interrupting device and a limited-slip differential in which the configuration of a holder unit for holding and preventing rotation of a magnetic flux generation unit that generates magnetic flux when current is applied thereto can be simplified, and of which the manufacturing cost can be thereby reduced.

A power transmission interrupting device according to a first aspect of the present disclosure is configured to interrupt power transmission between a first rotating member and a second rotating member that are housed inside a case member and disposed so as to be rotatable relative to each other around a common rotational axis, the power transmission interrupting device including: an interrupting member that is restrained from rotating relative to the first rotating member, has engaging teeth engaging with the second rotating member, and is movable in an axial direction between a coupling position at which the engaging teeth engage with the second rotating member and an uncoupling position at which the engaging teeth do not engage with the second rotating member; and a moving mechanism that moves the interrupting member in the axial direction. The moving mechanism has an annular magnetic flux generation unit having a coil that generates magnetic flux when current is applied thereto, a holder unit that holds the magnetic flux generation unit, and a moving member that constitutes a magnetic path of the magnetic flux and moves in the axial direction with the interrupting member. The holder unit includes: a yoke made of a soft magnetic material and having a cylindrical part that faces the magnetic flux generation unit in a radial direction; and a restraint member having an axial movement restraining part that is fixed to the yoke and restrains the magnetic flux generation unit from moving in the axial direction relative to the cylindrical part, and a rotation restraining part that is locked in a locking portion provided in the case member and restrains the yoke from rotating relative to the case member.

A limited-slip differential according to a second aspect of the present disclosure includes: a case member; a first rotating member housed inside the case member; a second rotating member housed inside the case member and disposed so as to be rotatable relative to the first rotating member around a common rotational axis; a third rotating member housed inside the case member and disposed so as to be rotatable relative to the first rotating member and the second rotating member around the common rotational axis; an interrupting member that is restrained from rotating relative to the first rotating member, has engaging teeth engaging with the second rotating member, and is movable in an axial direction between a coupling position at which the engaging teeth engage with the second rotating member and an uncoupling position at which the engaging teeth do not engage with the second rotating member; and a moving mechanism that moves the interrupting member in the axial direction. In this limited-slip differential, in a state where the engaging teeth of the interrupting member are not engaged with the second rotating member, power input into the first rotating member is allocated to the second rotating member and the third rotating member so as to allow for differential motion thereof. As the engaging teeth of the interrupting member engage with the second rotating member, differential motion of the first rotating member and the second and third rotating members is limited. The moving mechanism has an annular magnetic flux generation unit having a coil that generates magnetic flux when current is applied thereto, a holder unit that holds the magnetic flux generation unit, and a moving member that constitutes a magnetic path of the magnetic flux and moves in the axial direction with the interrupting member. The holder unit includes: a yoke made of a soft magnetic material and having a cylindrical part that faces the magnetic flux generation unit in a radial direction; and a restraint member having an axial movement restraining part that is fixed to the yoke and restrains the magnetic flux generation unit from moving in the axial direction relative to the cylindrical part, and a rotation restraining part that is locked in a locking portion provided in the case member and restrains the yoke from rotating relative to the case member.

According to the power transmission interrupting device and the limited-slip differential of the above aspects, it is possible to simplify the configuration of the holder unit for holding and preventing rotation of the magnetic flux generation unit that generates magnetic flux when current is applied thereto, and to thereby reduce the manufacturing cost.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8A is a sectional view of the interrupting member, a bottom of a first case member, and an annular wall of a first side gear as seen from the circumferential direction, schematically illustrating an action of a cam mechanism;

FIG. 8B is a sectional view of the interrupting member, the bottom of the first case member, and the annular wall of the first side gear as seen from the circumferential direction, schematically illustrating an action of the cam mechanism;

FIG. 8C is a sectional view of the interrupting member, the bottom of the first case member, and the annular wall of the first side gear as seen from the circumferential direction, schematically illustrating an action of the cam mechanism;

DETAILED DESCRIPTION OF EMBODIMENTS

A first embodiment of the present disclosure will be described with reference to FIG. 1 to FIG. 9B. The embodiment described below is shown as a preferred specific example for implementing the present disclosure. While some part of the embodiment specifically illustrates various technically preferable matters, the technical scope of the present disclosure is not limited to such specific aspects.

Figure 1:
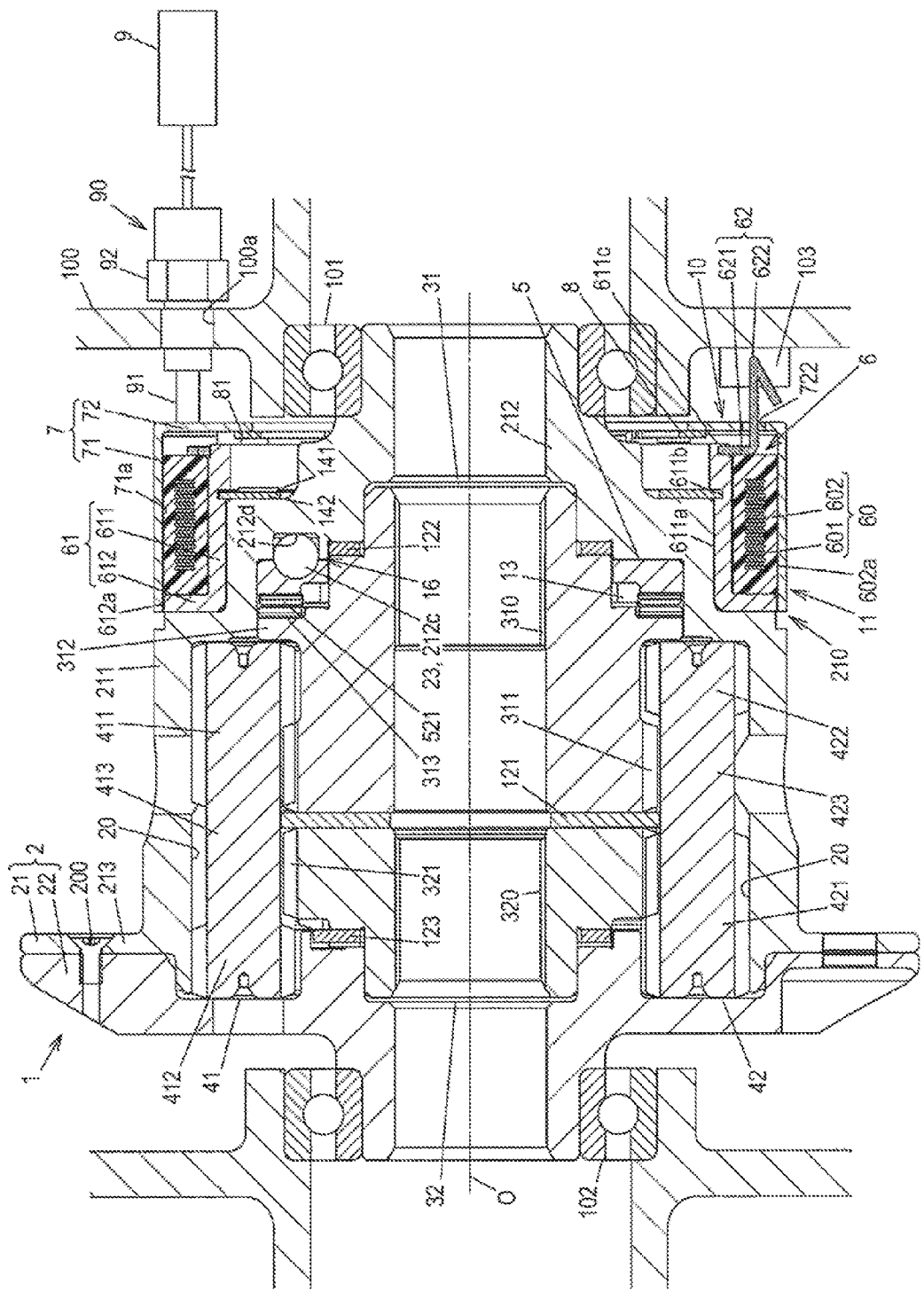
FIG. 1 is a sectional view showing the configuration of a limited-slip differential according to a first embodiment of the present disclosure.
Figure 2:
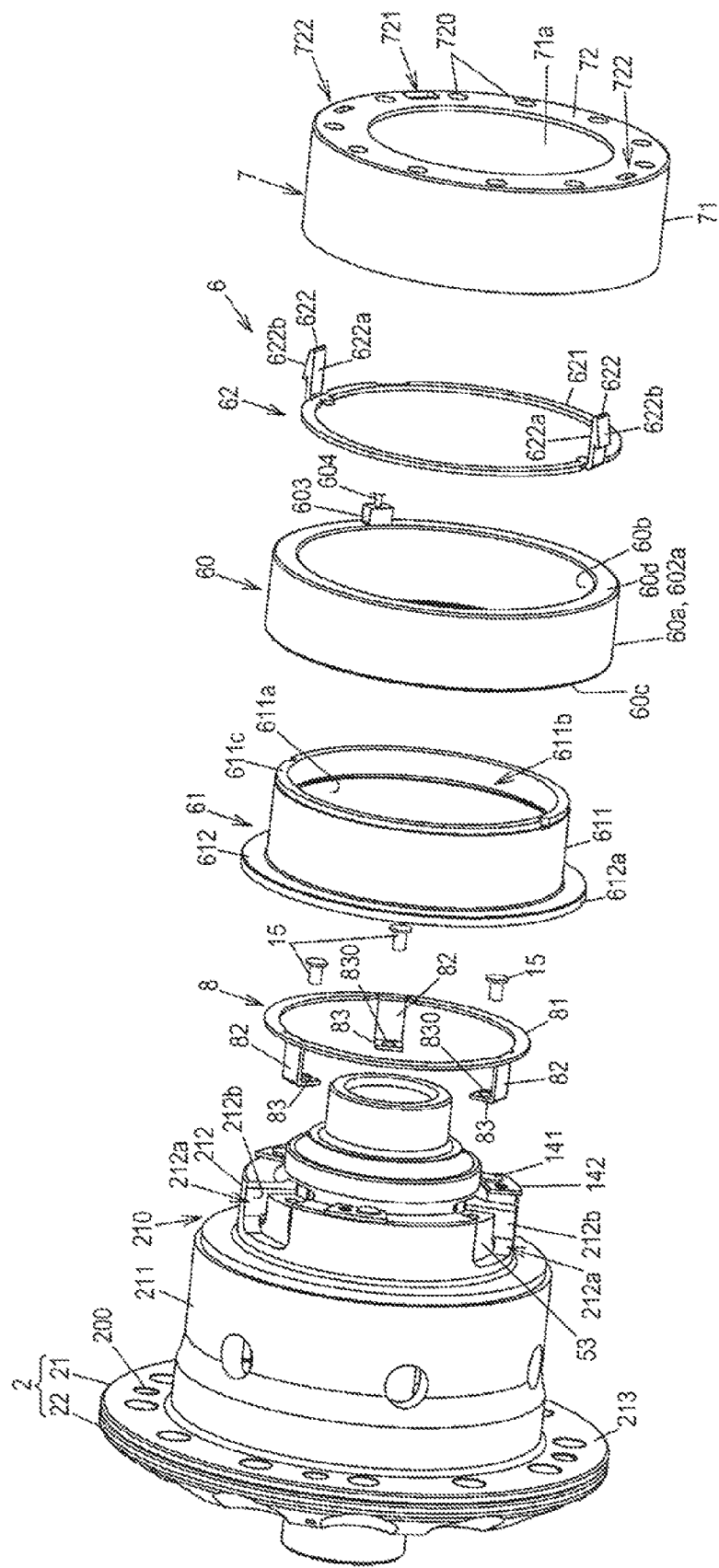
FIG. 2 is an exploded perspective view of the limited-slip differential.
Figure 3:
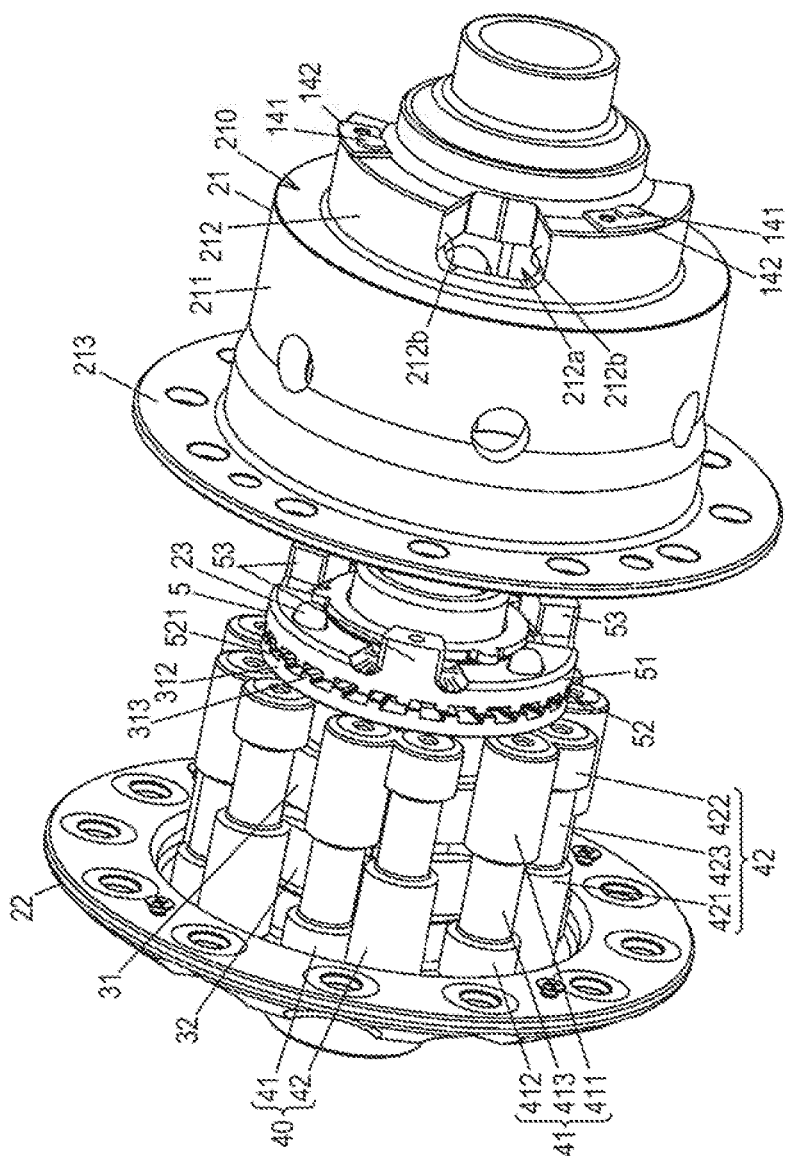
FIG. 3 is an exploded perspective view showing the internal structure of a differential case of the limited-slip differential.
Figure 4A:
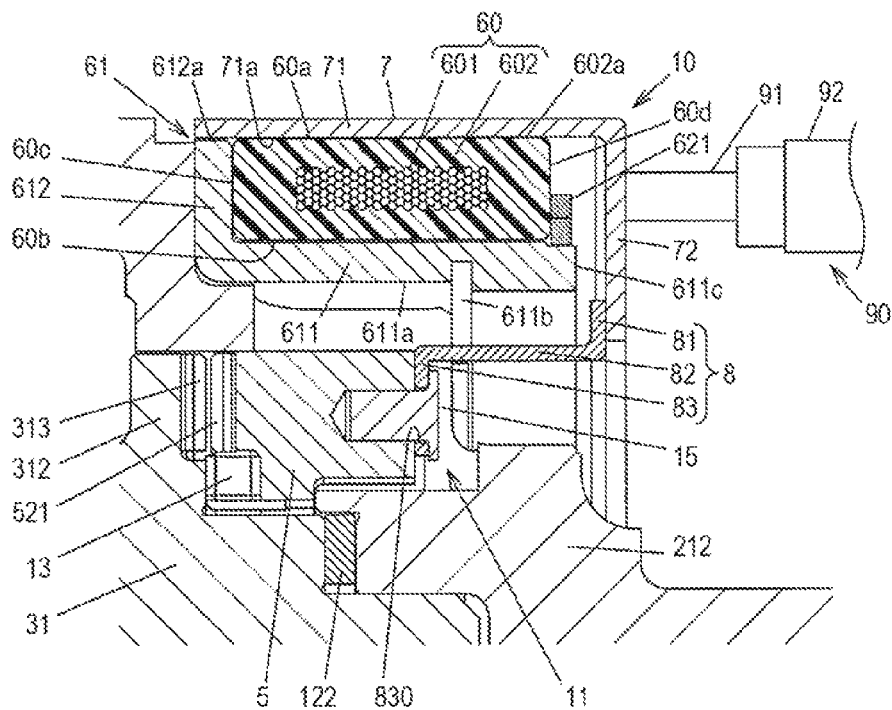
FIG. 4A is an enlarged sectional view showing a part of the limited-slip differential.
Figure 4B:
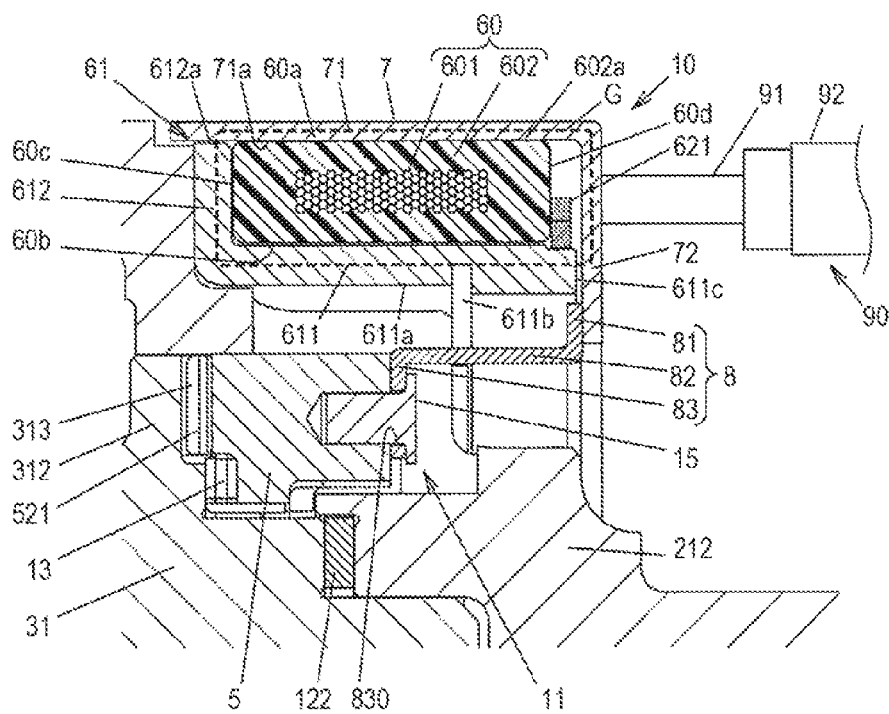
FIG. 4B is an enlarged sectional view showing a part of the limited-slip differential.

FIG. 1 is a sectional view showing an example of the configuration of a limited-slip differential according to an embodiment of the present disclosure. FIG. 2 is an exploded perspective view of the limited-slip differential. FIG. 3 is an exploded perspective view showing the internal structure of a differential case of the limited-slip differential. FIG. 4A and FIG. 4B are enlarged sectional views showing a part of the limited-slip differential.

A limited-slip differential 1 is used to allocate power from a driving source, such as an engine or an electric motor, of a vehicle to a pair of output shafts so as to allow for differential motion thereof. More specifically, the limited-slip differential 1 according to this embodiment is used, for example, as a differential gear that allocates power from a driving source to left and right wheels, and allocates input power to left and right drive shafts serving as a pair of output shafts.

The limited-slip differential 1 includes: a differential carrier 100 as a case member; a differential case 2 that rotates while being supported by the differential carrier 100; a first side gear 31 and a second side gear 32 housed inside the differential case 2; a plurality of (in this embodiment, five) pinion gear pairs 40 each composed of a first pinion gear 41 and a second pinion gear 42 engaged with each other, an interrupting member 5 that can interrupt power transmission between the differential case 2 and the first side gear 31; a moving mechanism 10 that moves the interrupting member 5; and a position sensor 90 that outputs an electrical signal indicating an action state of the moving mechanism 10. The interrupting member 5, the moving mechanism 10, and the position sensor 90 constitute a power transmission interrupting device 11 that interrupts power transmission between the differential case 2 and the first side gear 31. The power transmission interrupting device 11 is controlled by a controller 9.

The first side gear 31 and the second side gear 32 are cylindrical. A spline fitting part 310 to which one output shaft is coupled so as not to be rotatable relative to the first side gear 31 is formed in the inner circumferential surface of the first side gear 31, and a spline fitting part 320 to which the other output shaft is coupled so as not to be rotatable relative to the second side gear 32 is formed in the inner circumferential surface of the second side gear 32.

The differential case 2 is housed inside the differential carrier 100 fixed to a vehicle body, and is rotatably supported through a pair of bearings 101, 102. As shown in FIG. 1, the differential carrier 100 is provided with a mounting hole 100a in which the position sensor 90 is mounted. The differential carrier 100 is packed with gear oil with a viscosity suitable for gear lubrication, and the limited-slip differential 1 is used in an environment lubricated by this gear oil.

The differential case 2, the first side gear 31, and the second side gear 32 are disposed so as to be rotatable relative to one another around a common rotational axis O. Hereinafter, a direction parallel to the rotational axis O will be referred to as the axial direction.

The differential case 2 has a plurality of retention holes 20 in which the first pinion gears 41 and the second pinion gears 42 of the pinion gear pairs 40 are rotatably retained. The first pinion gear 41 and the second pinion gear 42 revolve around the rotational axis O, and are rotatable inside the retention hole 20 with their respective central axes as the rotational axis.

The first side gear 31 and the second side gear 32 have the same outer diameter, and gear parts 311, 321 composed of a plurality of helical teeth are respectively formed on the outer circumferential surfaces. A center washer 121 is disposed between the first side gear 31 and the second side gear 32. A first side washer 122 is disposed on the lateral side of the first side gear 31, and a second side washer 123 is disposed on the lateral side of the second side gear 32.

The first pinion gear 41 integrally has a long gear part 411, a short gear part 412, and a coupling part 413 coupling together the long gear part 411 and the short gear part 412 in the axial direction. Similarly, the second pinion gear 42 integrally has a long gear part 421, a short gear part 422, and a coupling part 423 coupling together the long gear part 421 and the short gear part 422 in the axial direction.

The first pinion gear 41 has the long gear part 411 engaged with the gear part 311 of the first side gear 31 and the short gear part 422 of the second pinion gear 42, and has the short gear part 412 engaged with the long gear part 421 of the second pinion gear 42. The second pinion gear 42 has the long gear part 421 engaged with the gear part 321 of the second side gear 32 and the short gear part 412 of the first pinion gear 41, and has the short gear part 422 engaged with the long gear part 411 of the first pinion gear 41. In FIG. 3, the helical teeth of these gear parts are not shown.

When the first side gear 31 and the second side gear 32 rotate at the same speed, the first pinion gear 41 and the second pinion gear 42 revolve with the differential case 2 without rotating inside the retention holes 20. When the rotation speeds of the first side gear 31 and the second side gear 32 differ, for example, during turning of the vehicle, the first pinion gear 41 and the second pinion gear 42 revolve while rotating inside the retention holes 20. Thus, power input into the differential case 2 is allocated to the first side gear 31 and the second side gear 32 so as to allow for differential motion thereof. The differential case 2, the first side gear 31, and the second side gear 32 are examples of the first rotating member, the second rotating member, and the third rotating member, respectively, of the present disclosure.

The interrupting member 5 is movable in the axial direction between a coupling position at which the interrupting member 5 couples together the differential case 2 and the first side gear 31 so as not to be rotatable relative to each other, and an uncoupling position at which the interrupting member 5 allows the differential case 2 and the first side gear 31 to rotate relative to each other. FIG. 4A shows a state where the interrupting member 5 is at the uncoupling position, and FIG. 4B shows a state where the interrupting member 5 is at the coupling position.

When the interrupting member 5 is at the coupling position, differential motion of the differential case 2 and the first side gear 31 is restrained, so that the first pinion gear 41 and the second pinion gear 42 become unable to rotate, and differential motion of the differential case 2 and the second side gear 32 is also restrained. The interrupting member 5 is urged toward the uncoupling position by a return spring 13 disposed between the first side gear 31 and the interrupting member 5.

The moving mechanism 10 has: an annular magnetic flux generation unit 60 that generates magnetic flux when current is applied thereto; a holder unit 6 that holds the magnetic flux generation unit 60; a plunger 7 that constitutes a magnetic path G (see FIG. 4B) of the magnetic flux generated as current is applied to the magnetic flux generation unit 60, and serves as a moving member moving in the axial direction with the interrupting member 5; and a coupling member 8 that couples together the interrupting member 5 and the plunger 7. The holder unit 6 holds the magnetic flux generation unit 60 relative to the differential case 2 and the differential carrier 100.

The magnetic flux generation unit 60 is formed by an electromagnet having a coil 601 that is an annular winding of a conductive wire such as an enamel wire, and a molded resin part 602 molded around the coil 601. The magnetic flux generation unit 60 has a rectangular shape in cross-section, with the coil 601 disposed at a central part, and a surface of the magnetic flux generation unit 60 including an outer circumferential surface 60a (outer circumferential surface 602a of the molded resin part 602) is formed by the molded resin part 602. As shown in FIG. 2, the magnetic flux generation unit 60 is provided with a boss 603 protruding from one axial end face, and an electric wire 604 through which excitation current is supplied to the coil 601 is led out from the boss 603. The controller 9 supplies excitation current through the electric wire 604 to the magnetic flux generation unit 60 to generate magnetic flux in the magnetic path G.

The holder unit 6 includes a yoke 61 that is made of a soft magnetic material such as a ferrous metal, and a restraint member 62 that prevents the yoke 61 from rotating relative to the differential carrier 100 and restrains the magnetic flux generation unit 60 from moving relative to the yoke 61. With the plunger 7, the yoke 61 constitutes the magnetic path G of the magnetic flux of the magnetic flux generation unit 60.

As shown in the enlarged views of FIG. 4A and FIG. 4B, the yoke 61 integrally has a cylindrical part 611 covering an inner circumferential surface 60b of the magnetic flux generation unit 60 from an inside, and a collar 612 protruding outward from one axial end of the cylindrical part 611 and covering an axial end face 60c of the magnetic flux generation unit 60. The cylindrical part 611 and the magnetic flux generation unit 60 face each other in the radial direction. An inner diameter of the cylindrical part 611 is slightly larger than an outer diameter of a part of the differential case 2 that faces an inner circumferential surface 611a of the cylindrical part 611.

Along the inner circumferential surface 611a of the cylindrical part 611, an annular recess 611b is formed into which a plurality of (in this embodiment, three) plates 142 made of a non-magnetic material and fixed to the differential case 2 with press-fit pins 141 are fitted. With the plates 142 fitted into the annular recess 611b, the yoke 61 is restrained from moving in the axial direction relative to the differential case 2. An axial width of the annular recess 611b is slightly larger than a thickness of the plate 142 so that rotation resistance does not occur between the yoke 61 and the plates 142 when the differential case 2 rotates.

The restraint member 62 is fixed by welding, for example, to an end of the cylindrical part 611 of the yoke 61 located on a side opposite from the collar 612. The restraint member 62 is made of a non-magnetic material, such as austenitic stainless steel, and integrally has an axial movement restraining part 621 that restrains the magnetic flux generation unit 60 from moving in the axial direction relative to the cylindrical part 611 of the yoke 61, and rotation restraining parts 622 that are locked in locking portions 103 (see FIG. 1) provided in the differential carrier 100 and restrain the yoke 61 from rotating relative to the differential carrier 100. The axial movement restraining part 621 is fitted on the cylindrical part 611 and fixed to the yoke 61. Extension portions 622a are locked in the locking portions 103 and restrain the yoke 61 from rotating relative to the differential carrier 100.

The axial movement restraining part 621 of the restraint member 62 has an annular shape extending along the circumferential direction of the cylindrical part 611 of the yoke 61, and restrains the magnetic flux generation unit 60 from moving in the axial direction (moving toward the side opposite from the collar 612) relative to the cylindrical part 611 of the yoke 61. The magnetic flux generation unit 60 is restrained from moving in the axial direction relative to the yoke 61, as an axial end face 60d (an end face opposite from the axial end face 60c facing the collar 612 of the yoke 61) butts against the axial movement restraining part 621.

In this embodiment, as shown in FIG. 2, the restraint member 62 has a pair of rotation restraining parts 622. The pair of rotation restraining parts 622 are provided at symmetrical positions across the rotational axis O, and are each provided with a hook 622b. However, the number of the rotation restraining parts 622 of the restraint member 62 is not limited to two but may instead be three or more. In this embodiment, the hook 622b is folded at a leading end of the extension portion 622a toward a radially outer side of the axial movement restraining part 621. The differential carrier 100 is provided with the two locking portions 103 in which the pair of rotation restraining parts 622 are respectively locked, and only one of the locking portions 103 is shown in FIG. 1.

The plunger 7 is made of a soft magnetic material, such as low-carbon steel, and integrally has a cylindrical part 71 disposed on an outer circumference of the magnetic flux generation unit 60, and an annular side plate 72 facing the magnetic flux generation unit 60 in the axial direction. With the cylindrical part 71 and the side plate 72 of the plunger 7, the yoke 61 constitutes the magnetic path G of the magnetic flux of the magnetic flux generation unit 60. The cylindrical part 71 has a cylindrical shape covering the entire magnetic flux generation unit 60 from an outer circumferential side. The side plate 72 protrudes inward from one axial end of the cylindrical part 71. The side plate 72 faces, in the axial direction, the axial end face 60d (the end face opposite from the axial end face 60c facing the collar 612 of the yoke 61) of the magnetic flux generation unit 60, the axial movement restraining part 621 of the restraint member 62, and the axial end face 611c of the cylindrical part 611 of the yoke 61.

The plunger 7 is supported by the magnetic flux generation unit 60, with an inner circumferential surface 71a of the cylindrical part 71 in contact with the outer circumferential surface 602a of the molded resin part 602. When the plunger 7 moves in the axial direction, the inner circumferential surface 71a of the cylindrical part 71 slides on the outer circumferential surface 602a of the molded resin part 602. The inner circumferential surface 71a of the cylindrical part 71 faces an end face 612a on an outer circumferential side of the collar 612 of the yoke 61 in the radial direction.

The side plate 72 has a plurality of (in the example shown in FIG. 2, ten) oil holes 720 through which the above-mentioned gear oil flows, a first through-hole 721 through which the boss 603 of the magnetic flux generation unit 60 is inserted, and the two second through-holes 722 through which the pair of rotation restraining parts 622 of the restraint member 62 are respectively inserted. The oil holes 720, the first through-hole 721, and the second through-holes 722 penetrate the side plate 72 in the axial direction. An inner circumferential-side end of the side plate 72 is formed as a butting portion against which the coupling member 8 butts.

The extension portion 622a of the restraint member 62 is inserted through the second through-hole 722 and thereby restrains the plunger 7 from rotating relative to the yoke 61. The hook 622b is elastic enough to be able to pass through the second through-hole 722 of the plunger 7 along with the extension portion 622a. More specifically, when the extension portion 622a and the hook 622b are passed through the second through-hole 722 of the side plate 72, the hook 622b passes through the second through-hole 722 by elastically deforming so as to overlap the extension portion 622a.

After passing through the second through-hole 722, the hook 622b elastically returns to its original shape and the folded leading end is separated from the extension portion 622a, so that the hook 622b is at least partially located further on the radially outer side than the second through-hole 722 of the plunger 7. Thus, when the plunger 7 moves toward the leading end of the extension portion 622a, the plunger 7 is prevented from being detached from the yoke 61 as the side plate 72 butts against the hooks 622b of the restraint member 62.

The coupling member 8 is formed, for example, by pressing a plate material made of a non-magnetic material such as austenitic stainless steel, and integrally has a ring-shaped annular part 81 that butts against the side plate 72 of the plunger 7, three extension portions 82 extending from the annular part 81 in the axial direction, and fixing portions 83 protruding inward from leading ends of the extension portions 82 and fixed to the interrupting member 5. When the vehicle is in motion, the coupling member 8 rotates with the differential case 2, with the annular part 81 sliding on the side plate 72 of the plunger 7. The fixing portion 83 has an insert hole 830 through which a press-fit pin 15 is inserted to fix the coupling member 8 to the interrupting member 5.

The differential case 2 has a first case member 21 and a second case member 22 fixed to each other with a plurality of screws 200. The first case member 21 is rotatably supported by the differential carrier 100 through the bearing 101, while the second case member 22 is rotatably supported by the differential carrier 100 through the bearing 102.

The first case member 21 integrally has a cylindrical part 211 that rotatably retains the plurality of pinion gear pairs 40, a bottom 212 extending inward from one end of the cylindrical part 211, and a flange 213 butted against the second case member 22. An annular recess 210 in which the magnetic flux generation unit 60 is disposed is formed at a corner between the cylindrical part 211 and the bottom 212.

The first side gear 31 and the second side gear 32 are disposed inside the cylindrical part 211. The first case member 21 is made of a metal with lower magnetic permeability than the yoke 61, and a ring gear (not shown) is fixed to the flange 213. The differential case 2 is rotated around the rotational axis O by power transmitted through the ring gear.

As shown in FIG. 2 and FIG. 3, the bottom 212 of the first case member 21 has a plurality of insert holes 212a into which the extension portions 82 and the fixing portions 83 of the coupling member 8 are inserted. The insert holes 212a penetrate the bottom 212 in the axial direction. Projections 53 of the interrupting member 5, to be described later, are also inserted into the insert holes 212a. As the projections 53 are inserted into the insert holes 212a, the interrupting member 5 is restrained from rotating relative to the differential case 2. In this embodiment, three insert holes 212a are formed at regular intervals in the circumferential direction of the bottom 212.

Figure 5A:
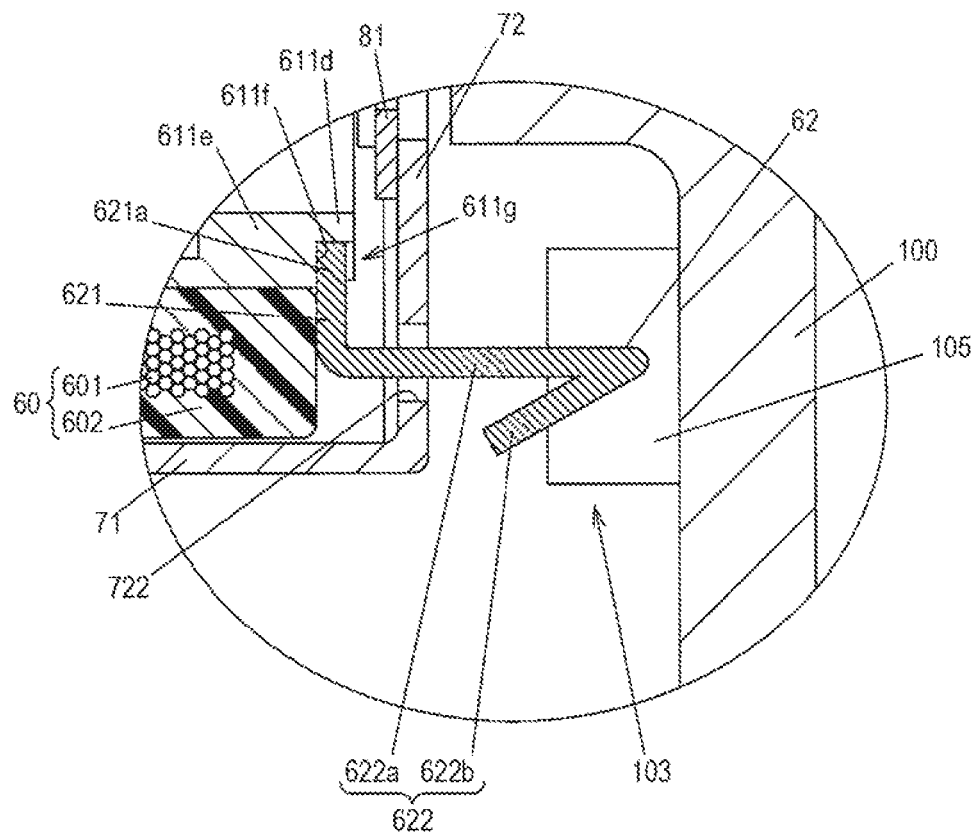
FIG. 5A is a partially enlarged view of FIG. 1, showing a restraint member and its surroundings.
Figure 5B:
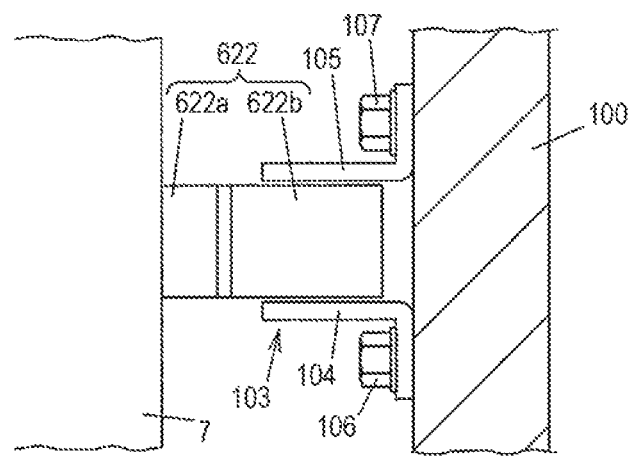
FIG. 5B is a view showing the configuration of a locking portion of a differential carrier as seen from a radial direction of the differential case.
Figure 6:
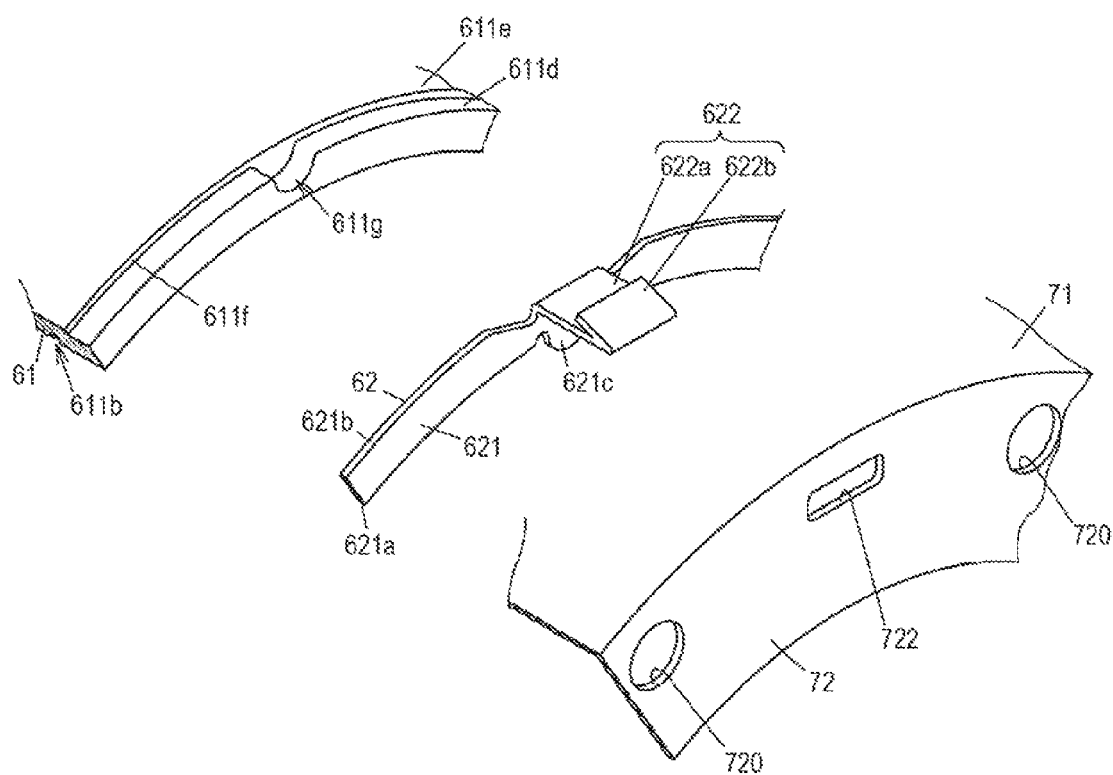
FIG. 6 is an enlarged perspective view showing a part of the restraint member in a circumferential direction, a part of a cylindrical part of a yoke on which an axial movement restraining part of the restraint member is fitted, and a part of a plunger.

FIG. 5A is a partially enlarged view of FIG. 1, and shows an enlarged section of the axial movement restraining part 621 and the rotation restraining part 622 of the restraint member 62. FIG. 5B is a view showing the configuration of the locking portion 103 of the differential carrier 100 as seen from the radial direction of the differential case 2. FIG. 6 is an enlarged perspective view showing a part of the restraint member 62 in the circumferential direction, a part of the cylindrical part 611 of the yoke 61 on which the axial movement restraining part 621 of the restraint member 62 is fitted, and a part of the plunger 7.

The rotation restraining part 622 of the restraint member 62 has the extension portions 622a extending in the axial direction from base ends thereof located on the axial movement restraining part 621, and the hooks 622b folded at an acute angle from the leading ends of the extension portions 622a. In this embodiment, the extension portion 622a is extended in the axial direction from an outer circumferential end of the axial movement restraining part 621, and the hook 622b is folded from the extension portion 622a toward an outer diameter side in the radial direction of the axial movement restraining part 621.

The extension portion 622a is inserted through the second through-hole 722 of the plunger 7. The hook 622b is provided further on a leading end side of the extension portion 622a than the side plate 72 of the plunger 7. When the rotation restraining part 622 is inserted through the second through-hole 722 of the side plate 72, the hook 622b elastically deforms so as to pass through the second through-hole 722. After passing through the second through-hole 722, the hook 622b elastically returns to its original shape, and the folded leading end is separated from the extension portion 622a.

The plunger 7 is prevented from being extracted from the restraint member 62 by the hooks 622b. Specifically, when the plunger 7 moves toward the leading end of the extension portion 622a (toward a side opposite from the axial movement restraining part 621) relative to the yoke 61, the plunger 7 is prevented from being detached from the yoke 61 and the restraint member 62 as the side plate 72 butts against the hooks 622b. Moreover, the restraint member 62 restrains the plunger 7 from rotating relative to the yoke 61 by having the rotation restraining parts 622 inserted through the second through-holes 722 of the side plate 72 and locked in the locking portions 103. That is, axial movement and rotation of the plunger 7 relative to the yoke 61 are prevented by the restraint member 62.

As shown in FIG. 6, at an end of the cylindrical part 611 of the yoke 61 located on the side opposite from the collar 612, a small diameter portion 611d on which the axial movement restraining part 621 of the restraint member 62 is fitted, and a large diameter portion 611e having a larger outer diameter than the small diameter portion 611d are formed, and a step surface 611f is formed between an outer circumferential surface of the small diameter portion 611d and an outer circumferential surface of the large diameter portion 611e. Of an inner circumferential surface 621a and an outer circumferential surface 621b of the axial movement restraining part 621 of the restraint member 62, the inner circumferential surface 621a is fitted on the small diameter portion 611d from an outside. One axial side surface of the axial movement restraining part 621 butts against the step surface 611f.

The outer diameter of the large diameter portion 611e is smaller than an outer diameter of the axial movement restraining part 621 of the restraint member 62, and the axial movement restraining part 621 partially protrudes in a direction of the outer diameter from the outer circumferential surface of the large diameter portion 611e. Aside surface of this protruding part of the axial movement restraining part 621 faces the axial end face 60d of the magnetic flux generation unit 60 in the axial direction.

A dent 611g dented radially inward is formed in the small diameter portion 611d of the yoke 61. On the other hand, a protrusion 621c engaging with the dent 611g of the yoke 61 is provided in an inner diameter portion of the axial movement restraining part 621 of the restraint member 62. As the protrusion 621c engages in the dent 611g, the restraint member 62 is positioned in the circumferential direction of the yoke 61.

As shown in FIG. 5B, the locking portion 103 has a first locking member 104 that butts against the rotation restraining part 622 of the restraint member 62 when the yoke 61 rotates toward one side around the rotational axis O, and a second locking member 105 that butts against the rotation restraining part 622 of the restraint member 62 when the yoke 61 rotates toward the other side. The rotation restraining part 622 has the leading end located between the first locking member 104 and the second locking member 105. The first locking member 104 and the second locking member 105 are fixed to a main body of the differential carrier 100 with bolts 106, 107.

When excitation current is supplied to the coil 601 of the magnetic flux generation unit 60, magnetic flux is generated in the magnetic path G shown in FIG. 4B, so that the side plate 72 of the plunger 7 is attracted to the yoke 61. Thus, the plunger 7 moves in the axial direction, with the inner circumferential surface 71a of the cylindrical part 71 of the plunger 7 sliding on the outer circumferential surface 602a of the molded resin part 602. As the plunger 7 thus moves in the axial direction, the interrupting member 5 coupled to the plunger 7 by the coupling member 8 moves in the axial direction from the uncoupling position to the coupling position.

Figure 7A:
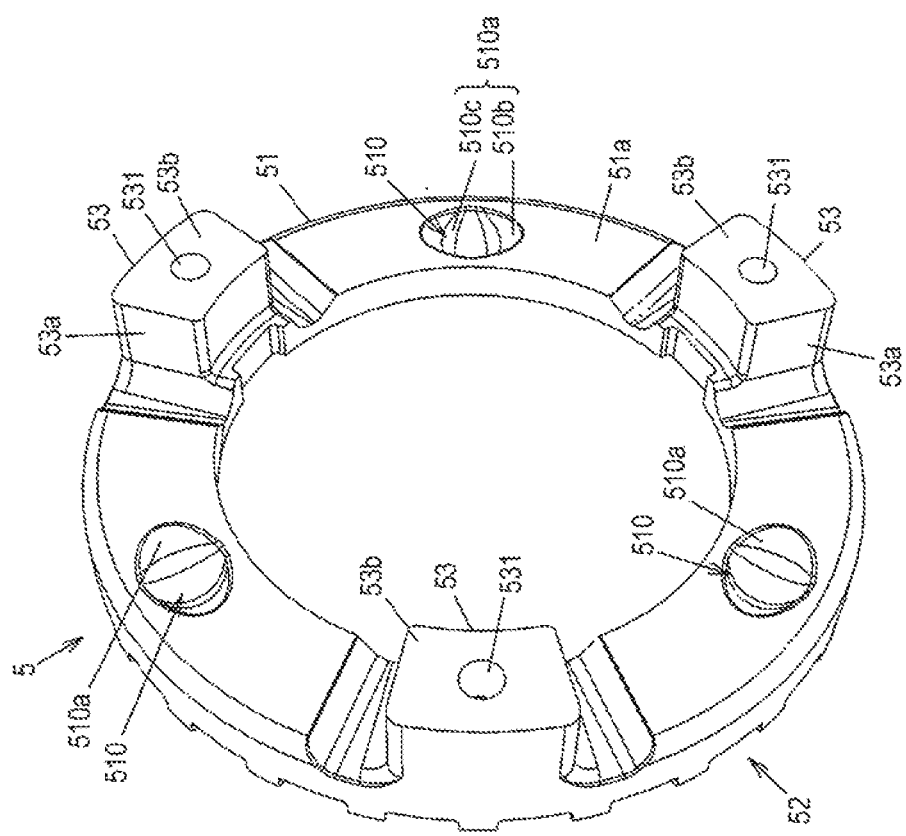
FIG. 7A is a perspective view showing an interrupting member.
Figure 7B:
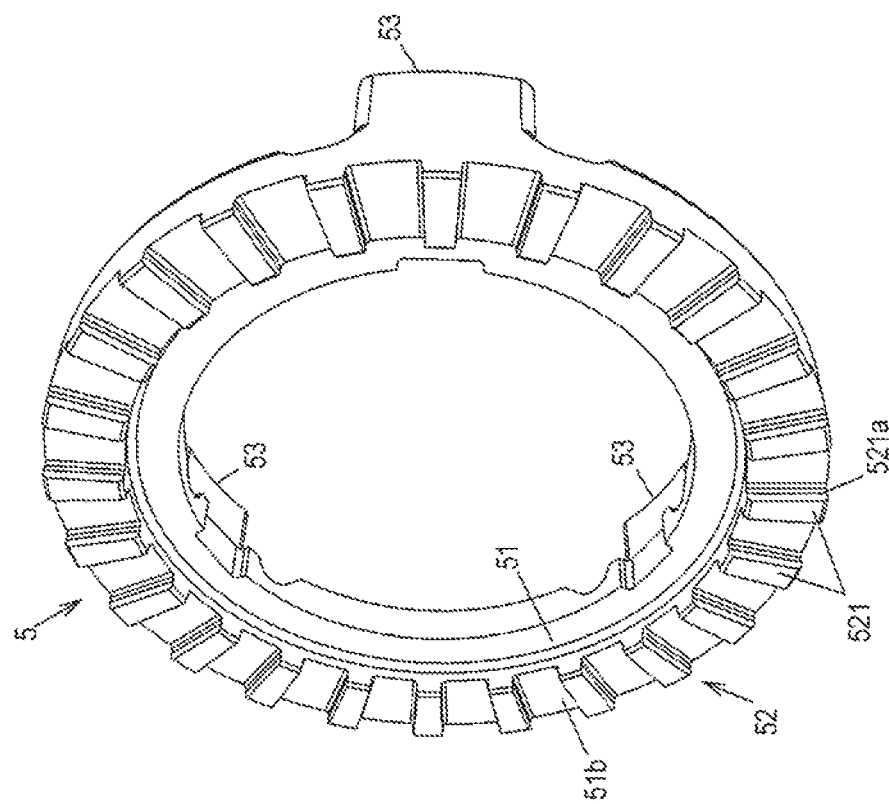
FIG. 7B is a perspective view showing the interrupting member.

FIG. 7A and FIG. 7B are perspective views showing the interrupting member 5. An outermost diameter (a diameter at an outermost part) of the interrupting member 5 is smaller than an inner diameter of the yoke 61, and the interrupting member 5 is disposed inside the magnetic flux generation unit 60. The interrupting member 5 integrally has an annular plate-like disc part 51 in one axial end face 51a of which a plurality of bowl-shaped recesses 510 are formed, an engaging part 52 formed in the other axial end face 51b of the disc part 51 that faces the first side gear 31 in the axial direction, and the trapezoidal columnar projections 53 formed so as to project in the axial direction from the one axial end face 51a of the disc part 51.

The one axial end face 51a of the disc part 51 faces the bottom 212 of the first case member 21 in the axial direction. The projections 53 are partially inserted into the insert holes 212a formed in the bottom 212 of the first case member 21. The engaging part 52 has a plurality of engaging teeth 521 protruding in the axial direction. The plurality of engaging teeth 521 are formed in a part on the outer circumferential side of the other axial end face 51b of the disc part 51, and a part of the axial end face 51b further on the inner side than the engaging part 52 serves as a flat receiving surface against which the return spring 13 butts and which receives an urging force thereof toward the uncoupling position.

As shown in FIG. 1, the first side gear 31 has a plurality of engaging teeth 313, engaging with the plurality of engaging teeth 521 of the interrupting member 5, formed in an annular wall 312 that is provided so as to protrude further toward the outer circumferential side than the gear part 311.

As the interrupting member 5 is pressed by the plunger 7 through the coupling member 8 so as to move to the coupling position, the plurality of engaging teeth 521 of the engaging part 52 engage with the plurality of engaging teeth 313 of the first side gear 31. That is, when the interrupting member 5 moves toward the first side gear 31, the interrupting member 5 and the first side gear 31 are coupled together so as not to be rotatable relative to each other through engagement between the pluralities of engaging teeth 521, 313. Conversely, when the interrupting member 5 moves to the uncoupling position under the urging force of the return spring 13, the engaging teeth 521, 313 are disengaged, so that the interrupting member 5 and the first side gear 31 can rotate relative to each other.

In the first case member 21, engaged parts with which the projections 53 of the interrupting member 5 engage in the circumferential direction are formed by the insert holes 212a. The projection 53 of the interrupting member 5 has a butting surface 53a that butts against an inner surface 212b (see FIGS. 2 and 3) of the insert hole 212a and receives power from the first case member 21. The butting surface 53a is the end face of the projection 53 in the circumferential direction. The butting surface 53a of the projection 53 and the inner surface 212b of the insert hole 212a against which the butting surface 53a butts are flat surfaces parallel to the rotational axis O. When the interrupting member 5 receives power from the first case member 21, the butting surface 53a of the projection 53 comes in surface contact with the inner surface 212b of the insert hole 212a.

A press-fit hole 531 into which the press-fit pin 15 is press-fitted is formed in a leading end face 53b of the projection 53. As the press-fit pins 15 inserted through the insert holes 830 formed in the fixing portions 83 of the coupling member 8 are press-fitted into the press-fit holes 531, the interrupting member 5 is fixed so as to move integrally with the coupling member 8 in the axial direction. Alternatively, the fixing portions 83 of the coupling member 8 and the projections 53 of the interrupting member 5 may be fastened together with bolts instead of the press-fit pins 15. In this case, screw holes, instead of the press-fit holes 531, are formed in the leading end faces 53b of the projections 35.

An inner surface 510a of the bowl-shaped recess 510 is formed as a cam surface that generates a cam thrust force in the axial direction through rotation relative to the first case member 21. In other words, portions of the surface (one axial end face 51a) of the disc part 51 of the interrupting member 5 facing the bottom 212 of the first case member 21 are formed as the cam surface.

As shown in FIG. 1, the bottom 212 of the first case member 21 is provided with protrusions 212c protruding in the axial direction that butt against the inner surfaces 510a of the bowl-shaped recesses 510. In this embodiment, the protrusions 212c are formed by spherical bodies 23 fixed to the bottom 212. The spherical body 23 is retained on the first case member 21 while partially being housed in an axial dent 212d provided in the bottom 212. Alternatively, the protrusion 212c may be integrally formed as a part of the bottom 212.

The width in the circumferential direction of the insert hole 212a of the bottom 212 is larger than the width in the circumferential direction of the projection 53 of the interrupting member 5, so that the differential case 2 and the interrupting member 5 are rotatable relative to each other within a predetermined angular range according to the difference in width in the circumferential direction between the insert hole 212a and the projection 53. In the interrupting member 5, the inner surface 510a of the bowl-shaped recess 510 is formed over an angular range larger than this predetermined angular range. Thus, even when the interrupting member 5 rotates relative to the differential case 2, the leading end of the protrusion 212c (spherical body 23) always remains housed inside the bowl-shaped recess 510 and faces the inner surface 510a in the axial direction.

The protrusions 212c of the bottom 212 of the first case member 21 and the bowl-shaped recesses 510 of the disc part 51 of the interrupting member 5 constitute a cam mechanism 16 that generates an axial thrust force by which the interrupting member 5 is separated from the bottom 212. Next, actions of the cam mechanism 16 will be described with reference to FIG. 6A to FIG. 6C.

FIG. 8A to FIG. 8C are sectional views of the interrupting member 5, the bottom 212 of the first case member 21, and the annular wall 312 of the first side gear 31 as seen from the circumferential direction, schematically illustrating actions of the cam mechanism 16. In FIG. 8A and FIG. 8B, a direction of rotation of the first side gear 31 relative to the differential case 2 (first case member 21) is indicated by the arrow A.

As shown in FIG. 8A, the inner surface 510a of the bowl-shaped recess 510 is formed by a first inclined surface 510b and a second inclined surface 510c inclined respectively to one side and the other side relative to the circumferential direction of the interrupting member 5. Inclination angles of the first inclined surface 510b and the second inclined surface 510c relative to the circumferential direction of the interrupting member 5 are the same.

When no current is applied to the coil 601, the interrupting member 5 is pressed against the bottom 212 of the first case member 21 under the urging force of the return spring 13. This state is shown in FIG. 8A. As shown in FIG. 8A, the protrusion 212c of the bottom 212 butts against a deepest portion of the bowl-shaped recess 510, and the engaging teeth 521 of the interrupting member 5 and the engaging teeth 313 of the first side gear 31 are disengaged. When current is applied to the coil 601, the interrupting member 5 is pressed against the plunger 7 through the coupling member 8, and the interrupting member 5 engages with the first side gear 31. FIG. 8B shows a state at the beginning of this engagement, and FIG. 8C shows a state upon completion of the engagement.

As shown in FIG. 8B, when current is applied to the coil 601 and the interrupting member 5 is pressed, first, the engaging teeth 521 of the interrupting member and the engaging teeth 313 of the first side gear 31 engage with each other at tips. Thus engaged, the interrupting member 5 rotates along with the first side gear 31 to rotate relative to the differential case 2, while the protrusion 212c of the bottom 212 slides on the first inclined surface 150b or the second inclined surface 510c of the bowl-shaped recess 510. FIG. 8B shows the case where the protrusion 212c of the bottom 212 slides on the first inclined surface 510b of the bowl-shaped recess 510. As the protrusion 212c of the bottom 212 thus slides, a portion against which the protrusion 212c butts moves gradually to a shallow portion of the bowl-shaped recess 510, causing the interrupting member 5 to move toward the first side gear 31 under the cam thrust force.

The interrupting member 5 is restrained from rotating relative to the differential case 2, as the butting surface 53a of the projection 53 of the interrupting member 5 comes in contact with the inner surface 212b of the insert hole 212a of the first case member 21. Specifically, when the butting surface 53a of the projection 53 of the interrupting member 5 butts against the inner surface 212b of the insert hole 212a as shown in FIG. 8C, the interrupting member 5 stops rotating relative to the differential case 2, and the interrupting member 5 also stops moving in the axial direction relative to the differential case 2.

In the state where the engaging teeth 521 of the interrupting member 5 and the engaging teeth 313 of the first side gear 31 are completely engaged with each other, the differential case 2 and the interrupting member 5 are restrained from rotating relative to each other as the projection 53 of the interrupting member 5 is engaged in the insert hole 212a of the first case member 21, while the interrupting member 5 and the first side gear 31 are restrained from rotating relative to each other as the engaging teeth 521 of the interrupting member 5 and the engaging teeth 313 of the first side gear 31 are engaged with each other. Thus, relative rotation of the differential case 2 and the first side gear 31 is restrained, so that power is transmitted from the differential case 2 through the interrupting member 5 to the first side gear 31.

As differential motion of the differential case 2 and the first side gear 31 is restrained, the first pinion gear 41 and the second pinion gear 42 become unable to rotate. Accordingly, differential motion of the differential case 2 and the second side gear 32 is also restrained, so that power is transmitted from the differential case 2 through the first pinion gear 41 and the second pinion gear 42 to the second side gear 32.

Actions of the moving mechanism 10 are detected by the position sensor 90. The position sensor 90 outputs an electrical signal to the controller 9 according to an axial position of the plunger 7.

Figure 9A:
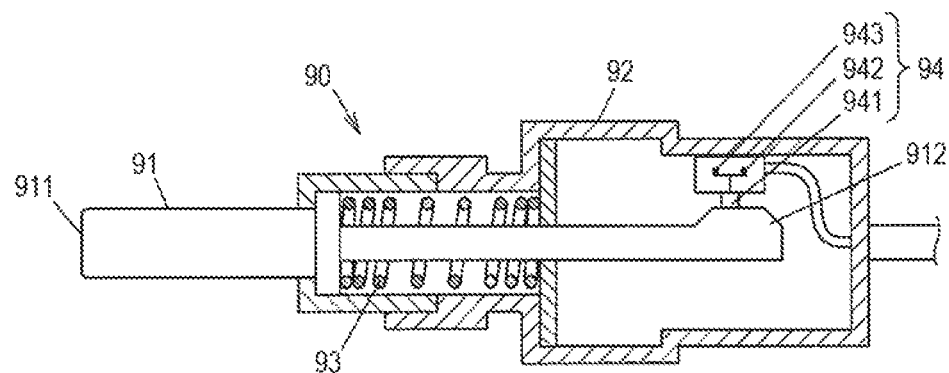
FIG. 9A is a diagram schematically showing an example of the configuration of a position sensor.
Figure 9B:
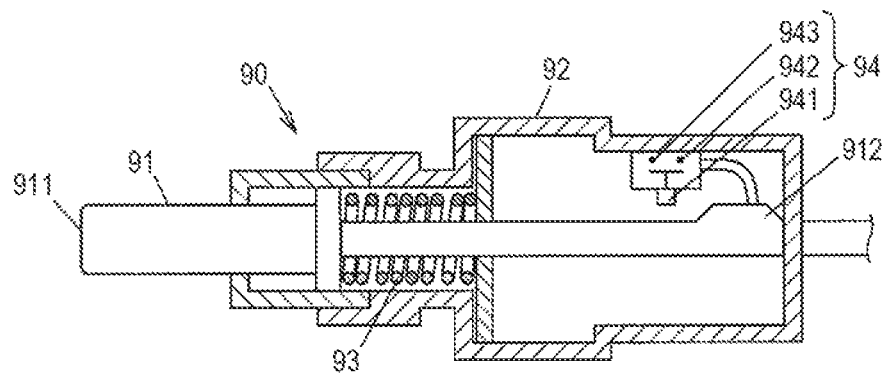
FIG. 9B is a diagram schematically showing an example of the configuration of the position sensor.

FIG. 9A and FIG. 9B are diagrams schematically showing examples of the configuration of the position sensor 90. In this embodiment, the position sensor 90 detects an axial position of the side plate 72 of the plunger 7. The position sensor 90 has a contactor 91 that elastically comes in contact with the side plate 72 of the plunger 7, a support 92 that supports the contactor 91, a spring 93 that urges the contactor 91 in a direction in which the contactor 91 sticks out from the support 92, and a switch 94 that is turned on and off according to a shift of the contactor 91 relative to the support 92.

The contactor 91 is a rod-like member that moves forward and backward relative to the support 92 in a direction parallel to the rotational axis O. Under the urging force of the spring 93, the contactor 91 butts at a leading end 911 against an outer surface (a side surface opposite from a surface facing the magnetic flux generation unit 60) of the side plate 72 of the plunger 7. A bulge 912 bulging in a direction orthogonal to the moving direction of the contactor 91 is provided at the other end of the contactor 91. When a movable piece 941 of the switch 94 is pushed in by the bulge 912 as the contactor 91 moves, a pair of terminals 942, 943 are electrically short-circuited.

A mounting position of the position sensor 90 in the differential carrier 100 is adjusted so that, when the interrupting member 5 moves to the coupling position as the plunger 7 moves in the axial direction, the pair of terminals 942, 943 of the switch 94 are electrically short-circuited to turn on the electrical signal, and so that, when the interrupting member 5 is at the uncoupling position, the pair of terminals 942, 943 of the switch 94 are insulated from each other to turn off the electrical signal. FIG. 9A shows the state where the interrupting member 5 is at the coupling position, and FIG. 9B shows the state where the interrupting member 5 is at the uncoupling position.

If, after supplying excitation current to the coil 601, the controller 9 cannot detect that the interrupting member 5 has moved to the coupling position through the electrical signal from the position sensor 90, the controller 9 outputs an abnormal signal. This abnormal signal is recognized by a driver of the vehicle through an indicator lamp or a warning alarm.

The embodiment having been described above offers the following main advantages.

The holder unit 6 that holds and prevents rotation of the magnetic flux generation unit 60 is composed of the yoke 61, and the restraint member 62 having the axial movement restraining part 621 that restrains the magnetic flux generation unit 60 from moving in the axial direction relative to the yoke 61 and the rotation restraining parts 622 that restrain the yoke 61 from rotating relative to the differential carrier 100. Thus, the configuration of the holder unit 6 can be simplified, and the manufacturing cost can be thereby reduced.

The plunger 7 is restrained from rotating relative to the yoke 61, as the rotation restraining parts 622 of the restraint member 62 are inserted through the second through-holes 722 of the side plate 72. Thus, the plunger 7 can be prevented from rotating by a simple configuration. Moreover, a part of the magnetic path G located on the side opposite from the interrupting member 5 in the axial direction can be formed by the side plate 72 of the plunger 7. Accordingly, the interrupting member 5 can be moved to the coupling position, as a clearance between the axial end face 611c of the cylindrical part 611 of the yoke 61 and the side plate 72 becomes narrow when current is applied to the coil 601. Thus, the configuration of the moving mechanism 10 can be simplified.

The plunger 7 is prevented from being extracted from the rotation restraining parts 622 of the restraint member 62 by butting against the hooks 622b. Thus, the plunger 7 is prevented from dropping off the restraint member 62 before being assembled to the differential carrier 100, so that the ease of assembly of the limited-slip differential 1 is enhanced.

As the axial movement restraining part 621 of the restraint member 62 has an annular shape extending in the circumferential direction of the cylindrical part 611 of the yoke 61, a contact area for the axial end face 60d of the magnetic flux generation unit 60 to butt against the axial movement restraining part 621 can be secured. Thus, even when the molded resin part 602 of the magnetic flux generation unit 60 vibrates while butted against the axial movement restraining part 621, wear of the molded resin part 602 can be prevented.

The axial movement restraining part 621 of the restraint member 62 is fixed with the inner circumferential surface 621a thereof fitted on the cylindrical part 611 of the yoke 61, without using a fixing member such as a bolt or a snap ring. Thus, the number of components of the limited-slip differential 1 can be reduced.

The magnetic flux generation unit 60 has the coil 601 molded in the molded resin part 602, and the plunger 7 is supported by the magnetic flux generation unit 60 while in contact with the outer circumferential surface 602a of the molded resin part 602. Thus, it is possible to support the plunger 7 so as to be movable in the axial direction by a simple configuration while suppressing sliding resistance of the plunger 7 moving in the axial direction.

The restraint member 62 restrains the magnetic flux generation unit 60 from moving in the axial direction relative to the yoke 61, as well as prevents the yoke 61 from rotating relative to the differential carrier 100, by the axial movement restraining part 621. Accordingly, it is not necessary to separately provide a member that restrains the magnetic flux generation unit 60 from moving in the axial direction and a member that prevents the yoke 61 from rotating, and thus the cost can be reduced.

As the restraint member 62 is made of a non-magnetic material, leakage of the magnetic flux of the magnetic flux generation unit 60 through the restraint member 62 to the differential carrier 100 is suppressed. Thus, it is possible to suppress a decrease in moving force, which causes the interrupting member 5 to move to the coupling position, due to leakage of magnetic flux.

The hook 622b elastically deforms so as to pass through the second through-hole 722 of the plunger 7, and after passing through the second through-hole 722, the hook 622b elastically returns to its original shape and the folded leading end is separated from the extension portion 622a. Thus, simply inserting the extension portions 622a and the hooks 622b through the second through-holes 722 can prevent the plunger 7 from being detached from the yoke 61.

The side plate 72 of the plunger 7 has the plurality of second through-holes 722, while the restraint member 62 has the pluralities of extension portions 622a and hooks 622b that are inserted through the plurality of second through-holes 722. Thus, when the plunger 7 moves in the axial direction relative to the magnetic flux generation unit 60 and the yoke 61, inclination and eccentricity of the plunger 7 relative to the rotational axis O are suppressed.

Figure 10A:
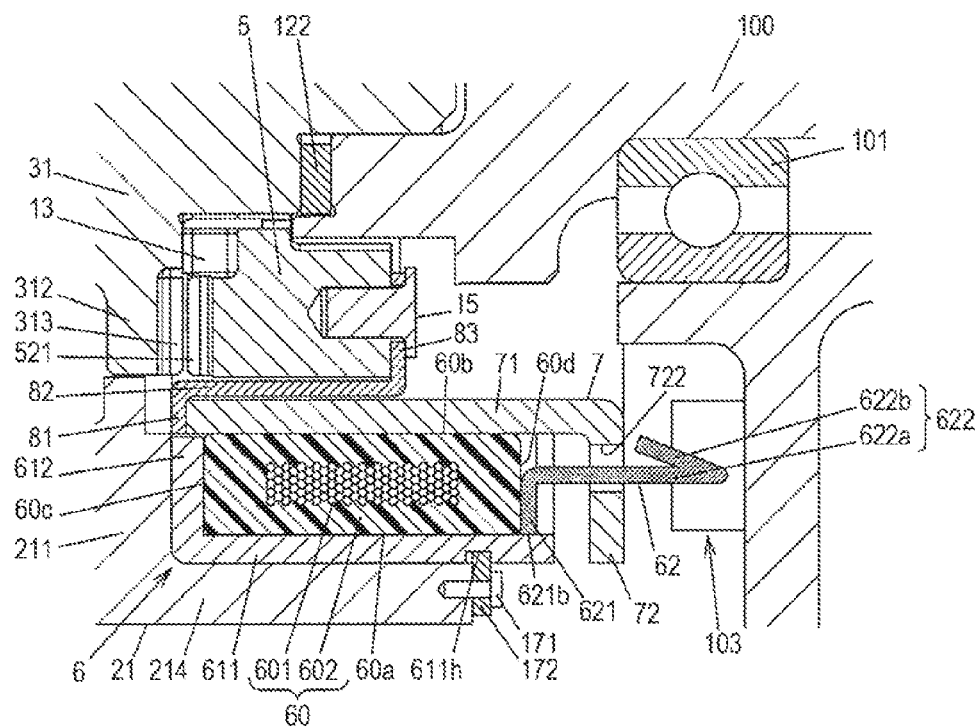
FIG. 10A is an enlarged sectional view showing a part of a limited-slip differential according to a second embodiment of the present disclosure.
Figure 10B:
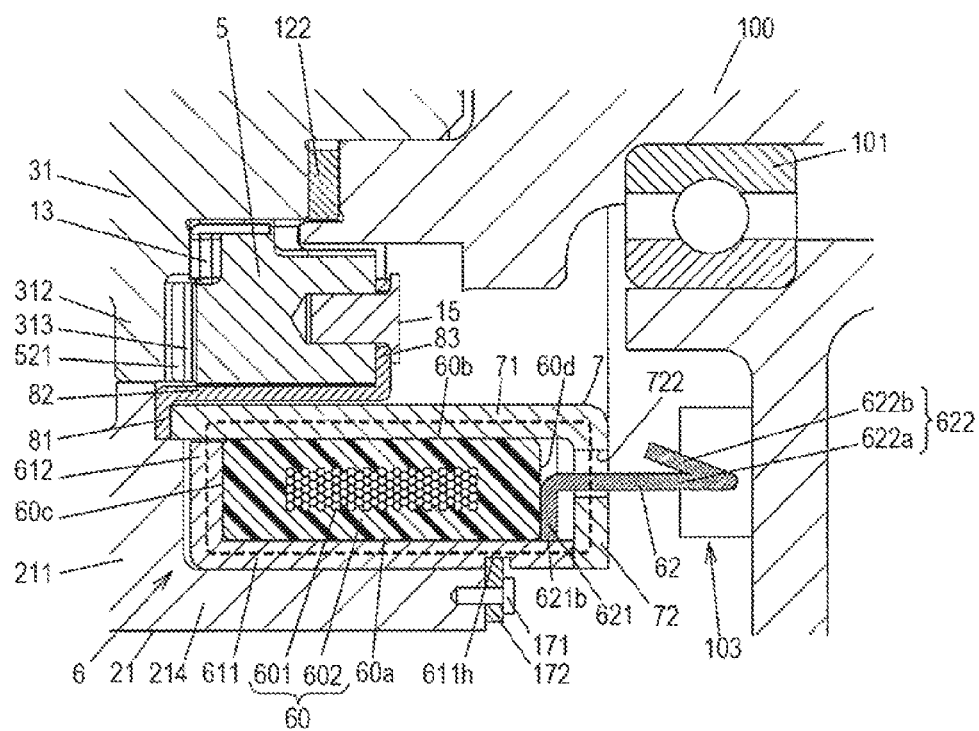
FIG. 10B is an enlarged sectional view showing a part of the limited-slip differential according to the second embodiment of the present disclosure.

Next, a second embodiment of the present disclosure will be described with reference to FIG. 10A and FIG. 10B. This embodiment is different from the first embodiment in the configurations of the holder unit 6 and the plunger 7, etc. As the second embodiment is otherwise the same as the first embodiment, only these differences will be described. In FIG. 10A and FIG. 10B, those components that correspond to the components described in the first embodiment are denoted by the same reference signs as in FIG. 4A etc.

FIG. 10A and FIG. 10B are enlarged sectional views showing a part of a limited-slip differential according to the second embodiment. FIG. 1A shows a state where the interrupting member 5 is at the uncoupling position, and FIG. 10B shows a state where the interrupting member 5 is at the coupling position.

In the first embodiment, the case has been described in which the yoke 61 integrally has the cylindrical part 611 and the collar 612 and the cylindrical part 611 covers the magnetic flux generation unit 60 from the inside. In this embodiment, the yoke 61 integrally has the cylindrical part 611 and the collar 612 that covers the axial end face 60c of the magnetic flux generation unit 60 as in the first embodiment, but the cylindrical part 611 covers the outer circumferential surface 60a, not the inner circumferential surface 60b, of the magnetic flux generation unit 60 from the outside. The collar 612 protrudes inward from the axial end of the cylindrical part 611.

In this embodiment, a cover 214 that covers a part of the cylindrical part 611 of the yoke 61 from an outer circumferential side is provided integrally with the cylindrical part 211 of the first case member 21 of the differential case 2. An annular recess 611h is formed in an outer circumferential surface of the cylindrical part 611. Plates 172 fixed with pins 171 to the cover 214 are engaged in the annular recess 611h, and the yoke 61 is restrained from moving in the axial direction through engagement of the plates 172.

In this embodiment, the plunger 7 integrally has the cylindrical part 71 and the side plate 72 as in the first embodiment, but the cylindrical part 71 is disposed on an inner circumference of the magnetic flux generation unit 60 and the side plate 72 protrudes outward from one axial end of the cylindrical part 71.

As in the first embodiment, the coupling member 8 integrally has the ring-shaped annular part 81, the three extension portions 82 (only one extension portion 82 is shown in FIG. 10A and FIG. 10B) extending from the annular part 81 in the axial direction, and the fixing portions 83 protruding inward from the leading ends of the extension portions 82 and fixed to the interrupting member 5. However, the annular part 81 is butted not against the side plate 72 of the plunger 7 but against an end face of the cylindrical part 71 of the plunger 7 located on a side of an axial end face of the differential case 2.

As in the first embodiment, the restraint member 62 integrally has the axial movement restraining part 621 that restrains the magnetic flux generation unit 60 from moving in the axial direction relative to the cylindrical part 611 of the yoke 61, and the rotation restraining parts 622 that are locked in the locking portions 103 of the differential carrier 100. The rotation restraining part 622 has the extension portion 622a extending in the axial direction from the axial movement restraining part 621, and the hook 622b folded at an acute angle from the leading end of the extension portion 622a. The base end of the extension portion 622a continues to the axial movement restraining part 621.

In this embodiment, the extension portion 622a is extended in the axial direction from an inner circumferential end of the axial movement restraining part 621, and the hook 622b is folded from the extension portion 622a toward an inner diameter side in the radial direction of the axial movement restraining part 621. The axial movement restraining part 621 of the restraint member 62 is fixed to the yoke 61, with the outer circumferential surface 621b fitted on the cylindrical part 611 of the yoke 61.

When the extension portion 622a and the hook 622b are inserted through the second through-hole 722 of the side plate 72, the hook 622b passes through the second through-hole 722 by elastically deforming so as to overlap the extension portion 622a. After passing through the second through-hole 722, the hook 622b returns to its original shape and the folded leading end is separated from the extension portion 622a. The hook 622b is at least partially located further on the radially inner side than the second through-hole 722 of the plunger 7. Thus, as in the first embodiment, when the plunger 7 moves toward the leading ends of the extension portions 622a, the plunger 7 is prevented from being detached from the yoke 61 as the side plate 72 butts against the hooks 622b of the restraint member 62.

This embodiment can also achieve effects similar to those of the first embodiment.

Figure 11:
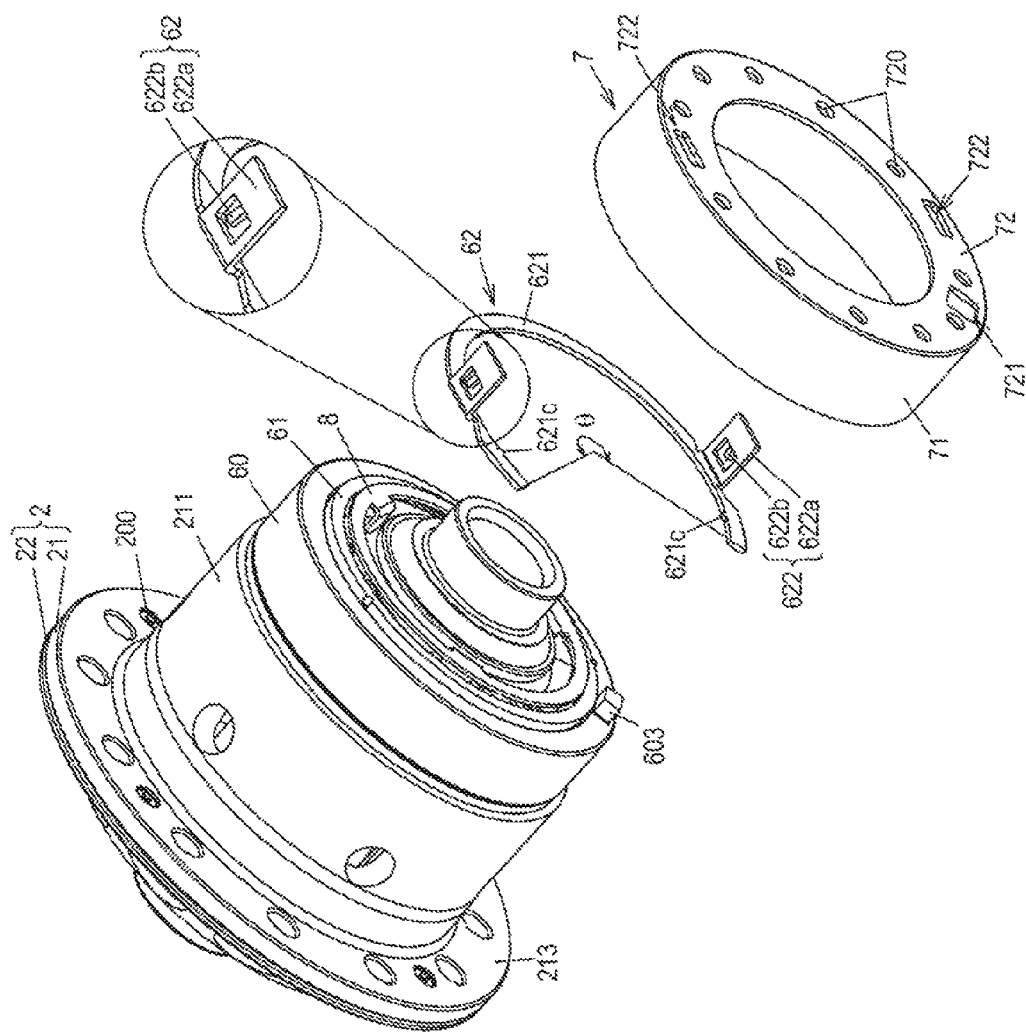
FIG. 11 is an exploded perspective view of a limited-slip differential according to a third embodiment of the present disclosure.

Next, a third embodiment of the present disclosure will be described with reference to FIG. 11. This embodiment is different from the first embodiment in the configuration of the restraint member 62. As the third embodiment is otherwise the same as the first embodiment, only these differences will be described. In FIG. 11, those components that correspond to the components described in the first embodiment are denoted by the same reference signs as in FIG. 2 and FIG. 6.

FIG. 11 is an exploded perspective view of a limited-slip differential according to the third embodiment. In the first embodiment, the extension portion 622a of the rotation restraining part 622 of the restraint member 62 has a rectangular shape with a long side extending in the axial direction, and the hook 622b is formed by being folded at an acute angle from the leading end of the extension portion 622a. In this embodiment, the hook 622b is formed by punching out a part of the rectangular extension portion 622a in a U-shape, and bending a tongue piece, surrounded at three sides by the punched part, toward the outer diameter side. As in the first embodiment, the hook 622b butts against the side plate 72 when the plunger 7 moves toward the leading end of the extension portion 622a, and thereby prevents the plunger 7 from being detached from the yoke 61. The extension portion 622a is opened by punching at both sides of the hook 622b in the circumferential direction and one side (side of the axial movement restraining part 621) of the hook 622b in the axial direction.

In the first embodiment, the case has been described in which the axial movement restraining part 621 of the restraint member 62 has an annular shape. In this embodiment, by contrast, the axial movement restraining part 621 has an arc shape extending along the circumferential direction of the cylindrical part 611 of the yoke 61. In this embodiment, too, the pair of rotation restraining parts 622 are provided at symmetrical positions across the rotational axis O, and the axial movement restraining part 621 extends within a range of an angle of the arc (θ indicated in FIG. 11) exceeding 180°. The axial movement restraining part 621 is fixed by being welded or tightly joined to the end of the cylindrical part 611 of the yoke 61 on the side opposite from the collar 612 so as not to be rotatable relative to the yoke 61.

This embodiment can also achieve effects similar to those of the first embodiment.

While the present disclosure has been described above on the basis of the embodiments, the present disclosure is not limited to these embodiments and can be implemented with modifications made thereto as appropriate within the scope of the gist of the disclosure. For example, in the embodiments, the case has been described in which the present disclosure is applied to a parallel-axis differential gear in which the rotational axes of the pair of side gears (first side gear 31 and second side gear 32) and those of the pair of pinion gears (first pinion gear 41 and second pinion gear 42) are parallel. However, the present disclosure is applicable not only to this type of gear but also to a limited-slip differential in which a pair of side gears and a pair of pinion gears engage with each other with their gear axes orthogonally crossed.

What is claimed is:

1. A power transmission interrupting device configured to interrupt power transmission between a first rotating member and a second rotating member that are housed inside a case member and disposed so as to be rotatable relative to each other around a common rotational axis, the power transmission interrupting device comprising:
   an interrupting member that is restrained from rotating relative to the first rotating member, has engaging teeth engaging with the second rotating member, and is movable in an axial direction between a coupling position at which the engaging teeth engage with the second rotating member and an uncoupling position at which the engaging teeth do not engage with the second rotating member; and
   a moving mechanism that moves the interrupting member in the axial direction, wherein:
   the moving mechanism has an annular magnetic flux generation unit having a coil that generates magnetic flux when current is applied thereto, a holder unit that holds the magnetic flux generation unit, and a moving member that constitutes a magnetic path of the magnetic flux and moves in the axial direction with the interrupting member; and
   the holder unit includes: a yoke made of a soft magnetic material and having a cylindrical part that faces the magnetic flux generation unit in a radial direction; and a restraint member having an axial movement restraining part that is fixed to the yoke and restrains the magnetic flux generation unit from moving in the axial direction relative to the cylindrical part, and a rotation restraining part that is locked in a locking portion provided in the case member and restrains the yoke from rotating relative to the case member.

2. The power transmission interrupting device according to claim 1, wherein:
   the moving member has an annular side plate that faces the magnetic flux generation unit in the axial direction;
   the side plate has a through-hole through which the rotation restraining part of the restraint member is inserted; and
   the restraint member restrains the moving member from rotating relative to the yoke by having the rotation restraining part inserted through the through-hole and locked in the locking portion.

3. The power transmission interrupting device according to claim 2, wherein:
   the rotation restraining part of the restraint member has an extension portion that extends from the axial movement restraining part in the axial direction and is inserted through the through-hole of the moving member, and a hook that is provided further on a leading end side of the extension portion than the side plate of the moving member; and
   when the moving member moves toward the leading end of the extension portion, the moving member is prevented from being detached from the yoke as the side plate butts against the hook.

4. The power transmission interrupting device according to claim 3, wherein the hook is at least partially located further on a radially inner side or a radially outer side than the through-hole of the moving member, and is elastic enough to be able to pass through the through-hole of the moving member along with the extension portion.

5. The power transmission interrupting device according to claim 1, wherein:
the axial movement restraining part of the restraint member has an annular shape or an arc shape extending in a circumferential direction of the cylindrical part of the yoke; and
the magnetic flux generation unit is restrained from moving in the axial direction relative to the yoke as an axial end face of the magnetic flux generation unit butts against the axial movement restraining part.

6. The power transmission interrupting device according to claim 5, wherein the axial movement restraining part of the restraint member is fixed to the yoke, with an inner circumferential surface or an outer circumferential surface of the axial movement restraining part fitted on the cylindrical part.

7. A limited-slip differential comprising:
a case member,
a first rotating member housed inside the case member,
a second rotating member housed inside the case member and disposed so as to be rotatable relative to the first rotating member around a common rotational axis;
a third rotating member housed inside the case member and disposed so as to be rotatable relative to the first rotating member and the second rotating member around the common rotational axis;
an interrupting member that is restrained from rotating relative to the first rotating member, has engaging teeth engaging with the second rotating member, and is movable in an axial direction between a coupling position at which the engaging teeth engage with the second rotating member and an uncoupling position at which the engaging teeth do not engage with the second rotating member; and
a moving mechanism that moves the interrupting member in the axial direction, wherein:
in a state where the engaging teeth of the interrupting member are not engaged with the second rotating member, power input into the first rotating member is allocated to the second rotating member and the third rotating member so as to allow for differential motion thereof;
as the engaging teeth of the interrupting member engage with the second rotating member, differential motion of the first rotating member and the second and third rotating members is limited;
the moving mechanism has an annular magnetic flux generation unit having a coil that generates magnetic flux when current is applied thereto, a holder that holds the magnetic flux generation unit, and a moving member that constitutes a magnetic path of the magnetic flux and moves in the axial direction with the interrupting member; and
the holder unit includes: a yoke made of a soft magnetic material and having a cylindrical part that faces the magnetic flux generation unit in a radial direction; and a restraint member having an axial movement restraining part that is fixed to the yoke and restrains the magnetic flux generation unit from moving in the axial direction relative to the cylindrical part, and a rotation restraining part that is locked in a locking portion provided in the case member and restrains the yoke from rotating relative to the case member.

* * * * *

UNITED STATES PATENT AND TRADEMARK OFFICE
CERTIFICATE OF CORRECTION

PATENT NO. : 9,989,140 B2
APPLICATION NO. : 15/444545
DATED : June 5, 2018
INVENTOR(S) : Minoru Onitake et al.

Page 1 of 1

It is certified that error appears in the above-identified patent and that said Letters Patent is hereby corrected as shown below:

On the Title Page

Item (71), the Applicant's information is incorrect. Item (71) should read:
--(71) Applicant: JTEKT CORPORATION, Osaka-shi (JP)--

Signed and Sealed this
Fourth Day of June, 2019

Andrei Iancu
*Director of the United States Patent and Trademark Office*